United States Patent
Lei et al.

(10) Patent No.: US 10,377,383 B2
(45) Date of Patent: Aug. 13, 2019

(54) VEHICLE LANE CHANGE

(71) Applicant: Ford Global Technologies, LLC, Dearborn, MI (US)

(72) Inventors: Oliver Lei, Windsor (CA); Allen R. Murray, Lake Orion, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/837,556

(22) Filed: Dec. 11, 2017

(65) Prior Publication Data

US 2019/0176830 A1    Jun. 13, 2019

(51) Int. Cl.
| | |
|---|---|
| *B60W 30/18* | (2012.01) |
| *G01S 17/02* | (2006.01) |
| *G08G 1/16* | (2006.01) |
| *G01S 17/93* | (2006.01) |
| *B60W 10/20* | (2006.01) |
| *B60W 10/18* | (2012.01) |

(52) U.S. Cl.
CPC ..... *B60W 30/18163* (2013.01); *G01S 17/023* (2013.01); *G01S 17/936* (2013.01); *G08G 1/167* (2013.01); *B60W 10/18* (2013.01); *B60W 10/20* (2013.01)

(58) Field of Classification Search
USPC ........................................................ 701/96
See application file for complete search history.

(56) References Cited

U.S. PATENT DOCUMENTS

| | | | |
|---|---|---|---|
| 8,818,682 B1* | 8/2014 | Dolgov | G05D 1/0055 |
| | | | 701/96 |
| 8,996,276 B2* | 3/2015 | Takazawa | G08G 1/161 |
| | | | 701/300 |
| 9,533,682 B2 | 1/2017 | KÜHne | |
| 9,550,528 B1* | 1/2017 | Hakeem | B62D 15/025 |
| 9,643,650 B2 | 5/2017 | Sim | |
| 9,669,872 B2 | 6/2017 | Rebhan et al. | |
| 9,672,734 B1* | 6/2017 | Ratnasingam | G08G 1/0112 |
| 9,715,830 B2 | 7/2017 | Jin | |
| 2010/0121576 A1* | 5/2010 | Aso | G01S 13/726 |
| | | | 701/301 |
| 2011/0227713 A1* | 9/2011 | Amann | B60W 30/0953 |
| | | | 340/435 |
| 2012/0083960 A1 | 4/2012 | Zhu et al. | |
| 2013/0338868 A1* | 12/2013 | Essame | B60W 30/18163 |
| | | | 701/23 |
| 2014/0350836 A1* | 11/2014 | Stettner | G01S 17/023 |
| | | | 701/301 |

(Continued)

FOREIGN PATENT DOCUMENTS

| | | |
|---|---|---|
| EP | 2926329 B1 | 6/2016 |
| KR | 20170053880 A | 5/2017 |

*Primary Examiner* — Tyler D Paige
(74) *Attorney, Agent, or Firm* — Frank A. MacKenzie; Bejin Bieneman PLC

(57) ABSTRACT

A system includes a processor. The system includes a memory, the memory storing instructions executable by the processor to identify a relative area within a specified distance from a first vehicle and free of another vehicle, identify a second vehicle within a second specified distance of the relative area, transmit the relative area to the second vehicle, and navigate the first vehicle to the relative area within a specified time.

20 Claims, 3 Drawing Sheets

(56) References Cited

U.S. PATENT DOCUMENTS

| | | | |
|---|---|---|---|
| 2015/0246672 A1* | 9/2015 | Pilutti | B60W 30/00 |
| | | | 701/2 |
| 2016/0232790 A1* | 8/2016 | Massey | B60W 30/08 |
| 2016/0357187 A1* | 12/2016 | Ansari | G01S 15/931 |
| 2017/0210394 A1 | 7/2017 | Yamada et al. | |
| 2017/0236421 A1* | 8/2017 | Yang | B60W 30/08 |
| | | | 701/301 |
| 2017/0242443 A1* | 8/2017 | Schuh | G05D 1/0257 |
| 2017/0243485 A1* | 8/2017 | Rubin | H04W 72/005 |
| 2017/0261990 A1* | 9/2017 | Lei | G05D 1/0214 |
| 2017/0316684 A1* | 11/2017 | Jammoussi | G06T 11/60 |
| 2018/0050664 A1* | 2/2018 | Tarte | B60R 25/31 |
| 2018/0178801 A1 | 6/2018 | Hashimoto et al. | |
| 2018/0244275 A1* | 8/2018 | Bremkens | B60W 30/18163 |

* cited by examiner

VEHICLE LANE CHANGE

BACKGROUND

A vehicle may identify an open space in traffic, e.g., in an adjacent lane and between other vehicles. The vehicle may navigate to such open space. The vehicle may detect the open space based on information from one or more sensors, e.g., radar sensors, scanning laser range finders, light detection and ranging (LIDAR) devices, and image processing sensors such as cameras. Based on data from such sensors, the vehicle may identify a current location of other vehicles and an open space between such vehicles. Based on the data from such sensors the vehicle may identify a current trajectory of the other vehicles, e.g., that one of the other vehicles is traveling at a certain speed in a certain lane. However, the data from the sensors is deficient concerning future locations of the detected vehicles, e.g., when such vehicles change course, e.g., change lanes. Accordingly, the vehicle may not detect one or more other vehicles that may interfere with navigation to the open space.

DETAILED DESCRIPTION

Introduction

Figure 1:
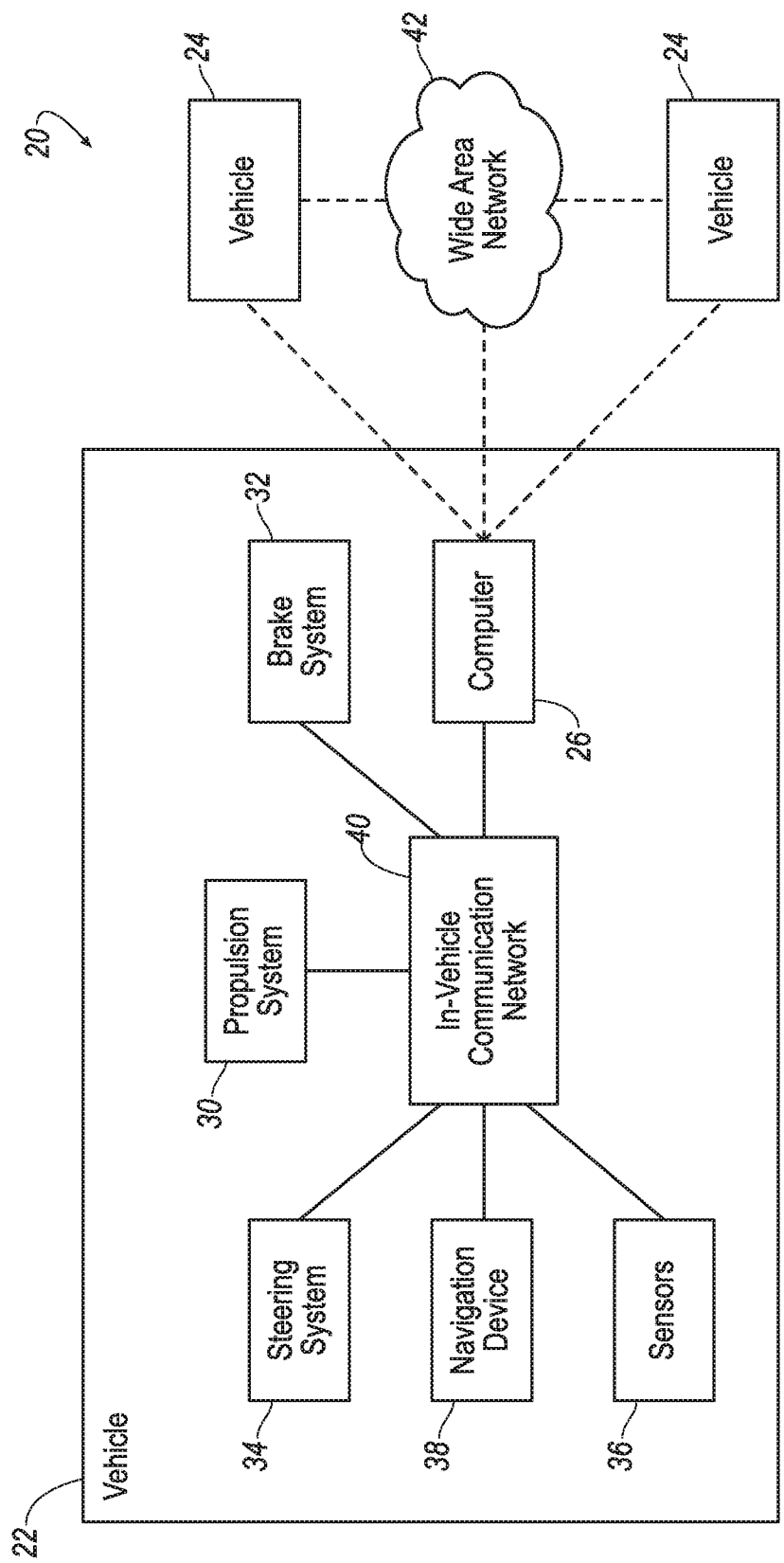
FIG. 1 is a block diagram of components of an example system for detecting future navigations of one more second vehicles.

A system includes a processor. The system includes a memory, the memory storing instructions executable by the processor to identify a relative area within a specified distance from a first vehicle and free of another vehicle, identify a second vehicle within a second specified distance of the relative area, transmit the relative area to the second vehicle, and navigate the first vehicle to the relative area within a specified time.

The memory may store instructions to refrain from navigating the first vehicle to the relative area upon receiving a message from the second vehicle including the relative area and a priority indication before the specified time has lapsed and before navigating the first vehicle to the relative area.

The priority indication may specify a vehicle maneuver.

The priority indication may specify a vehicle class.

The memory may store instructions to transmit the specified time along with the relative area.

The memory may store instructions to transmit a release message after transmitting the relative area.

The relative area may include a plurality of positions and a plurality of times, each position associated with a specific time.

The memory may store instructions to refrain from navigating the first vehicle to the relative area upon failing to navigate the first vehicle to the relative area within the specified time.

The memory may store instructions to navigate the first vehicle away from the relative area after navigating the first vehicle to the relative area and upon receiving a message from a third vehicle including the relative area and a priority indication.

A system includes a vehicle sensor. The system includes a propulsion system. The system includes a steering system. The system includes a computer in communication with the vehicle sensor, the propulsion system, and the steering system, the computer including a processor and a memory, the memory storing instructions executable by the processor to: identify, based on information from the vehicle sensor, a relative area within a specified distance from a first vehicle and free of another vehicle; identify a second vehicle within a second specified distance of the relative area; transmit the relative area to the second vehicle; and actuate the propulsion system and the steering system to navigate the first vehicle to the relative area within a specified time.

The vehicle sensor may be one of a LIDAR, a sonar, and a camera.

The memory may store instruction executable by the processor to identify the second vehicle based on information from the vehicle sensor.

The memory may store instructions executable by the processor to transmit the specified time with the relative area.

The memory may store instructions executable by the processor to transmit a release message after transmitting the relative area.

The relative area may include a plurality of positions and a plurality of times, each position associated with a specific time.

A method includes identifying a relative area within a specified distance from a first vehicle and free of another vehicle. The method includes identifying a second vehicle within a second specified distance of the relative area. The method includes transmitting the relative area to the second vehicle. The method includes navigating the first vehicle to the relative area within a specified time.

The method may include transmitting the specified time along with the relative area.

The method may include transmitting a release message after transmitting the relative area.

The relative area may include a plurality of positions and a plurality of times, each position associated with a specific time.

The method may include navigating the first vehicle away from the relative area after navigating the first vehicle to the relative area and upon receiving a message from a third vehicle including the relative area and a priority indication.

A computer may be programmed to perform the method.

A computer readable medium may store program instructions executable by a computer processor to perform the method.

The computer readable medium may store program instructions executable by the computer processor to refrain from navigating the first vehicle to the relative area upon receiving a message from the second vehicle including the relative area and a priority indication before the specified time has lapsed and before navigating the first vehicle to the relative area.

The priority indication may specify a vehicle maneuver.

The priority indication may specify a vehicle class.

The computer readable medium may store program instructions executable by the computer processor to refrain from navigating the first vehicle to the relative area upon failing to navigate the first vehicle to the relative area within the specified time.

Figure 2:
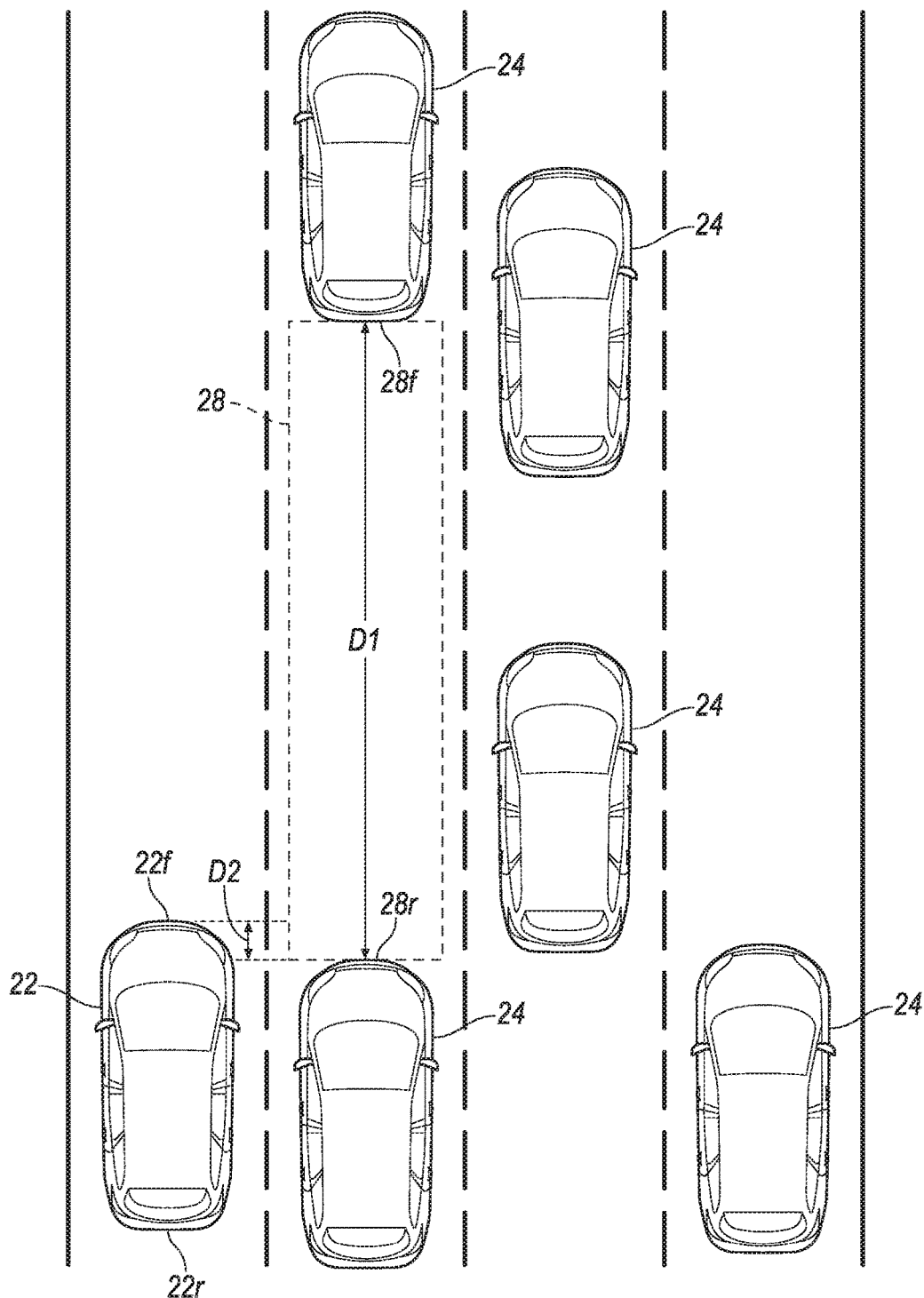
FIG. 2 is a perspective view of an example vehicle of FIG. 1 navigating a roadway.

With reference to FIGS. 1 and 2, a system 20 addresses deficiencies in technology provided for vehicle lane change situations by providing a first vehicle 22 including an advantageous arrangement of a computer 26, sensors 36, and other components to detect future navigations, i.e., planned or intended trajectories, of one more second vehicles 24 that may interfere with navigation of the first vehicle 22 along a roadway. For example, when the first and second vehicles 22, 24 both plan to navigate to an open space, e.g., an area 28, in a target lane, e.g., from lanes on opposite sides of the target lane, the first vehicle 22 can detect the second vehicle 24 in the lane on the opposite side of the target lane, and can detect that the second vehicle 24 plans to navigate to open space in the target lane. The system 20 includes the computer 26 having a processor and a memory. The memory stores instructions executable by the processor to identify the area 28 relative to the vehicle 22 that is free of second vehicles 24. The relative area 28 is defined by location coordinates determined relative to the first vehicle 22 and second vehicles 24. The memory stores instructions executable by the processor to identify one or more second vehicles 24 within a specified distance of the relative area 28, and to transmit the relative area 28 to the second vehicle(s) 24. The memory stores instructions executable by the processor to navigate the first vehicle 22 to the relative area 28 within a specified time.

A relative area 28 is an area relative to the vehicle 22, typically an area in a lane of travel immediately next to a lane of travel of the vehicle 22 on a roadway. The relative area 28 is typically a rectangle, and is defined according to a specified width, typically a detected width of a roadway, and a length determined by a distance D1, sometimes referred to herein as the area 28 length, between second vehicles 24 traveling in a same lane (e.g., measured from respective front and rear bumpers of the vehicles 24). This distance D1 typically must exceed a stored minimum distance threshold that is selected as a distance sufficient to permit another vehicle, e.g., the first vehicle 22, to move into the lane and occupy the area 28. As discussed further below, the computer 26 can store a table or the like of minimum distances based on various factors, e.g., vehicle speed, type of roadway, etc. The relative area 28 changes over time, i.e., as the vehicles 22, 24 travel down the roadway.

Vehicle

The first vehicle 22, as illustrated in FIGS. 1 and 2, may be any passenger or commercial automobile such as a car, a truck, a sport utility vehicle, a crossover vehicle, a van, a minivan, a taxi, a bus, etc. The first vehicle 22 has a front 22*f* and a rear 22*r*, e.g., relative to a usual driving direction of the first vehicle 22, relative to an orientation of a driver operating the vehicle, etc., i.e., the front 22*f* faces what is conventionally considered to be forward, and the rear 22*r* faces what is conventionally considered to be rearward.

The first vehicle 22 may operate in an autonomous (e.g., driverless) mode, a semi-autonomous mode, and/or a non-autonomous mode. For purposes of this disclosure, the autonomous mode is defined as one in which each of a propulsion system 30, a brake system 32, and a steering system 34 of the first vehicle 22 are controlled by one or more vehicle computers 26; in the semi-autonomous mode computer(s) 26 of the first vehicle 22 control(s) one or two of the vehicle propulsion system 30, brake system 32, and steering system 34; each of these are controlled by a human operator in the non-autonomous mode.

The first vehicle 22 may additionally include sensors 36, a navigation system 38, and an in-vehicle communication network 40 for providing communication between vehicle components such as the computer 26, the sensors 36, the navigation system 38, the propulsion system 30, the brake system 32, the steering system 34, etc.

The propulsion system 30 of the vehicle translates stored energy into motion of the vehicle 22. The propulsion system 30 may be a known vehicle subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion system 30. The propulsion system 30 is in communication with and receives input from the vehicle computer 26 and/or from a human driver. The human driver may control the propulsion system 30 via an input device, e.g., an accelerator pedal and/or a gear-shift lever.

The brake system 32 can be a conventional vehicle subsystem that can resist the motion of the vehicle to thereby slow and/or stop the vehicle 22. The brake system 32 may include friction brakes such as disc brakes, drum brakes, band brakes, etc.; regenerative brakes; a parking brake; any other suitable type of brakes; or a combination. The brake system 32 can include an electronic control unit (ECU) or the like that actuates the brake system 32 to resist the motion of the vehicle 22, e.g., upon a command from the vehicle computer 26 and/or from a human driver. The human driver may control the brake system 32 via an input device, e.g., a brake pedal.

The steering system 34 is typically a conventional vehicle steering subsystem and controls the turning of the wheels. The steering system 34 is in communication with and receives input from a steering wheel and/or the vehicle computer 26. The steering system 34 may include a rack-and-pinion system with electric power-assisted steering, a steer-by-wire system, or any other suitable system.

The vehicle sensors 36 may detect internal states of the vehicle 22, for example, wheel speed, wheel orientation, tire pressure, suspension travel, brake sensors, traction control sensors, and engine and transmission variables.

The vehicle sensors 36 may detect the position and/or orientation of the vehicle 22, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers.

The vehicle sensors 36 may detect the external world, for example, light measurement sensors, photometers, microphones, wind speed measurement sensors, radar sensors, scanning laser range finders, light detection and ranging (LIDAR) devices, and image processing sensors such as cameras.

The vehicle navigation system 38 can determine a location and orientation, e.g., a compass heading direction, of the first vehicle 22 according to map data, e.g., by geocoordinates and compass heading direction that can be used to determine a location and orientation of the first vehicle 22 on a map.

The map data may specify locations covered by roads as well as data about the roads and locations adjacent and/or proximate to the roads, such as a number of lanes of a road, direction(s) of travel of lanes, parking lot locations, etc.

The map data, which can include conventional data, e.g., geo-coordinates, concerning roads, landmarks, etc., may be stored locally, such as in the vehicle computer 26 memory (discussed below), in the vehicle navigation system 38, etc., and/or remotely, such as in a remote computer.

The vehicle navigation system 38 may rely on information from a global navigation satellite system, distance data from vehicle sensors 36 attached to a drivetrain of the vehicle 22, e.g., a gyroscope, an accelerometer, a magnetometer, and/or other vehicle sensors 36. Exemplary vehicle navigation systems 38 include one or more of known GPS (global positioning system) navigation devices, personal navigation devices, and automotive navigation systems.

The in-vehicle communication network 40 includes hardware, such as a communication bus, for facilitating communication among vehicle 22 components. The in-vehicle communication network 40 may facilitate wired or wireless communication among the vehicle 22 components, e.g., the computer 26, the brake system 32, the propulsion system 30, the steering system 34, the sensors 36, the navigation device 38, etc., in accordance with a number of communication protocols such as controller area network (CAN), Ethernet, WiFi, Local Interconnect Network (LIN), and/or other wired or wireless mechanisms.

The vehicle computer 26, implemented via circuits, chips, antennas and/or other electronic components, is included in the first vehicle 22 for carrying out various operations and processes, including those described herein. The vehicle computer 26 is a computing device that generally includes the processor and the memory, the memory including one or more forms of computer-readable media, and storing instructions executable by the processor for performing various operations and processes, including those disclosed herein. The vehicle computer 26 may be programmed by storing instructions on the memory that are executable by the processor.

The memory of the vehicle computer 26 further generally stores remote data received via various communications mechanisms; e.g., the vehicle computer 26 is generally configured for communications with vehicle components on the in-vehicle communication network 40, e.g., a controller area network (CAN) bus, and for using other wired or wireless protocols to communicate with devices outside the vehicle, e.g., one or more second vehicles 24, etc., e.g., via Universal Serial Bus (USB), Bluetooth®, IEEE 802.11 (colloquially referred to as WiFi®), satellite telecommunication protocols, and cellular protocols such as 3G, LTE, etc. Although one vehicle computer 26 is shown for ease of illustration, it is to be understood that the vehicle computer 26 could include, and various operations described herein could be carried out by, one or more computing devices.

The vehicle computer 26 can be programmed to identify a relative area 28 by identifying an area in an adjacent lane (i.e., immediately neighboring with no intervening lanes) where a distance D1 between vehicles 24 in the adjacent lane exceeds a threshold distance, e.g., selected as a distance sufficient for the vehicle 22 to safely move into the adjacent lane. Further, the computer 26 can be programmed to limit identification of a relative area 28 to areas in adjacent lanes that are within a specified distance of the vehicle 22. In one example, the specified distance is the lesser of a distance between a front-most edge 28f of the area 28 and a front bumper 22f of the vehicle 22, a distance between the front-most edge 28f of the area 28 and a rear bumper 22r of the vehicle 22, a distance D2 between a rear-most edge 28r of the area 28 and the front bumper 22f of the vehicle 22, or a distance between the rear-most edge 28r of the area 28 and the rear bumper 22r of the vehicle 22. In some cases, the specified distance must be negative, i.e., some portion of the vehicle 22 must overlap the area 28. In other examples, the specified distance can have a positive value.

The specified distance may be based on a speed of the vehicles 22, 24, e.g., the greater the speed of a vehicle 22 and/or a vehicle 24 the greater the specified distance. The specified distance may be based on a relative speed between the vehicles 22, 24. For example, when a difference between a speed of the vehicle 22 and one of the second vehicles 24 is below a threshold amount, e.g., 3 miles per hours, the specified distance may be negative. When the difference between the speed of the vehicle 22 and one of the second vehicles 24 is above the threshold amount, the specified distance may be positive.

The vehicle computer 26 may identify the relative area 28 based on information from the sensors 36, the navigation system 38, etc., e.g., received via the in-vehicle communication network 40. For example, the vehicle computer 26 may use information from a LIDAR sensor to identify locations of one or more second vehicles 24 relative to the first vehicle 22 and the map data. A "location," for purposes of this disclosure, is a point on the surface of the earth, and is typically specified according to coordinates in a known coordinate system, e.g., geo-coordinates specifying latitude and longitude as may be used in the Global Position System (GPS), or a coordinate system defined with respect to an object, such as a Cartesian or polar coordinate system having a point of origin in or on a vehicle 22, 24.

Respective locations of the one more second vehicles 24 may be tracked over time, e.g., to determine a speed, acceleration, heading, etc., of the one more second vehicles 24. The locations, speed, acceleration, heading, etc., may be used to predict future locations of the one or more second vehicles 24. For example, based on the locations and speeds of two second vehicles 24 traveling in a same lane with a certain amount of distance D1 therebetween, the vehicle computer 26 may predict the location of such second vehicles 24 a certain amount of time into the future, e.g., 5 seconds, including an amount of distance D1 between the second vehicles 24 (sometimes referred to as a space between the vehicles 24).

As mentioned above, a relative area 28 may be determined where a length of the relative area 28, i.e. a distance D1 between vehicles 24 in the adjacent lane, meets or exceeds a minimum distance threshold. The threshold minimum length for a relative area 28 may be based on various factors that may be determined substantially in real-time, e.g., vehicle 22 speed, as well as based on factors whose values can be stored in computer 26 memory, e.g., a wheelbase of the first vehicle 22, e.g., the length of a relative area 28 always should be larger than the vehicle 22 wheelbase. The threshold minimum area 28 length may further be based on speed(s) of the second vehicles 24, e.g., the higher the speed the greater the minimum length threshold. The area 28 is referred to as "relative" because the location (i.e., as determined by GPS coordinates or the like) of the area 28 changes over time, i.e., moves as vehicles 24 defining the area 28 move, as noted above.

The vehicle computer 26 may predict one or more future relative areas 28 at respective future times. For example, the computer 26 could predict that a space between the second vehicles 24, e.g., a location of a first vehicle 24 front bumper could identify a start point of a distance D1 defining the space, and a location of a second vehicle 24 could define an end point of the distance D1 defining the space, for a time that is 0.5 seconds after a current time upon determining, at the current time, the speed, acceleration, heading, etc., of the one more second vehicles 24. A similar prediction of the relative area 28 for a time that is 1.0 seconds after the current time could likewise be made, and so on. Thus, the computer 26 may predict the relative area 28 as function of time, e.g., including an initial position, an initial speed, an acceleration, etc. For example, a predicted relative area 28 may be determined according to current location coordinates for the relative area 28, plus a current speed of a vehicle 24 multiplied by an amount of time, plus one half the acceleration multiplied by the amount of time squared, where the amount of time is an amount of time between the current time and a future time for which the relative area 28 is being predicted. Other techniques may be used to identify the relative area 28.

The computer 26 may identify the relative area 28 based on data from sensors 36 used to identify the relative area 28, e.g., a LIDAR sensor, an ultrasound sensor, a camera, etc. The computer 26 may determine the minimum length threshold, as mentioned above for a relative area 28, according to a vehicle 22 wheelbase, a current speed of the first vehicle 22, a speed limit for a current roadway of travel, capabilities of the first vehicle 22, e.g., acceleration capabilities, etc.

The specified time for a lane change, i.e., to move the vehicle 22 into the relative area 28, may be determined empirically, e.g., based on an accuracy of the various techniques used to predict the position of the relative area 28 at a certain time into the future. For example, if a technique is shown to accurately predict the relative area 28 two seconds into the future 95% of the time, and to accurately predict the relative area 28 three seconds into the future 50% of the time, then the more accurate time may be used. The specified time, or a set of specified times based on factors such as speed, etc., may be stored in the memory of the vehicle computer 26, e.g., in a table or the like. The specified time may be based on the speeds and accelerations of the second vehicles 24 in front and behind the relative area 28, e.g., if the front second vehicle 24 is traveling slower than the rear second vehicle 24, then the space between the second vehicles 24 will decrease at a certain rate. The computer 26 may use the rate of such decrease along with the minimum distance threshold of the relative area 28 to determine the specified time, e.g., such that the length of the space does not decrease below the minimum distance threshold. Other techniques may be used to determine the specified time.

The vehicle computer 26 is programmed to identify a second vehicle 24 within a specified distance of the relative area 28. The vehicle computer 26 may identify the second vehicle 24 based on information from one or more vehicle sensors 36, e.g., from information received from the LIDAR sensor via the in-vehicle communication network 40. The vehicle computer 26 may identify the position, speed, acceleration, heading, etc., of the second vehicle 24 as described above.

The specified distance of a second vehicle 24 to the relative area 28 may be determined based on the position, speed, acceleration, etc., of the second vehicle 24, and measured as a distance from the vehicle 24 front or rear bumper 22f, 22r to a location of the area 28 at a front or rear edge 28f, 28r, for example. Further for example, the specified distance may be selected such that the second vehicle 24 may navigate to the relative area 28 with the specified time (as described above).

The vehicle computer 26 is programmed to transmit and receive messages and information to and from other vehicles. For example, the vehicle computer 26 may communicate with one or more second vehicles 24 via vehicle-to-vehicle communications, e.g., including DSRC (dedicated short-range communications) or the like. Alternatively or additionally, such communication may be transmitted via a wide area network 42. Messages and information transmitted by the vehicle computer 26 to one or more second vehicles 24 may include the relative area 28, the specified time, a release message, etc. Messages and information received by the vehicle computer 26 for one or more second vehicle 24 vehicles may include the relative area 28, a priority indication, etc.

Transmitting the relative area 28 includes specifying a plan of the transmitting vehicle 22, 24 to navigate to the relative area 28. To put it another way, the transmitting vehicle 22, 24 thus seeks to reserve the relative area 28, i.e., indicate to other vehicles 22, 24 not to occupy the relative area 28 within the specified time even though some or all of the area 28 may appear to be available for another vehicle 22, 24 to occupy, e.g., for a lane change. Including the specified time along with the relative area 28 indicates that the transmitting vehicle 22, 24 plans to navigate to the relative area 28 within the specified time.

A release message specifies that the transmitting vehicle 22, 24 no long plans to navigate to the relative area 28. To put it another way, the transmitting vehicle 22, 24 thereby releases its reservation of the relative area 28.

A priority indication specifies a priority level for a vehicle 22, 24 planning to navigate to the relative area 28, e.g., to be used when multiple vehicles 22, 24 plan to navigate to the relative area 28. For example, a vehicle 22, 24 having a higher priority may navigate to the relative area 28, while a vehicle 22, 24 having a lower priory may refrain from navigating to the relative area 28.

The priority indication may specify a planned vehicle maneuver. A vehicle maneuver is a trajectory, i.e., description of vehicle speeds and headings over time, of a vehicle 22, 24. For example, a vehicle maneuver may be specified for changing lanes to accommodate turning onto a road, merging on to, or off of, an expressway, etc. Such vehicle maneuver may need to be performed in a timely manner, e.g., lest the opportunity to turn or merge be missed. For example, a vehicle maneuver can include changing lanes to pass another vehicle 22, 24, enter a platoon with other vehicles 22, 24 for efficient travel, etc. Such maneuvers may be less time-sensitive as additional opportunities to pass, join a platoon, etc., may be available. Various vehicle maneuvers, and associated priority levels, may be stored in the memory of the vehicle computer 26, e.g., in a look-up table or the like. For example, changing lanes to turn may be associated with a higher priority than changing lanes to pass.

The priority indication may specify a vehicle class. A vehicle class is a category or type of vehicle 22, 24. Example vehicle classes may include emergency vehicles, e.g., police cars, firetrucks, ambulances, etc., commercial vehicles, e.g., semi-trucks, delivery vehicles, buses, etc., and personal vehicles, e.g., sedans, SUVs, etc. Various vehicle classes and associated priority levels may be stored in the memory of the vehicle computer 26, e.g., in a look-up table or the like. For example, an emergency vehicle may be associated with a higher priority than a personal vehicle.

The vehicle computer 26 may be programmed to operate the first vehicle 22. For example, the vehicle computer 26 may transmit instructions to the steering system 34, the propulsion system 30, and/or the brake system 32, e.g., via the in-vehicle communication network 40 and based on information from the sensors 36 and the navigation system 38. For example, the vehicle computer 26 may operate the first vehicle 22 to execute a maneuver to occupy, i.e., move into, the relative area 28, away from the relative area 28, etc.

Wide Area Network

The network 42 (sometimes referred to as the wide area network 42 because it can include communications between devices that are geographically remote from one another, i.e., not in a same building, vehicle, etc.) represents one or more mechanisms by which remote devices, e.g., the vehicle computer 26, the one or more second vehicles 24, etc., may communicate with each other. Accordingly, the network 42 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 42 include wireless communication networks (e.g., using Bluetooth, IEEE 802.11, etc.), local area networks (LAN) and/or wide area networks (WAN), including the Internet, providing data communication services.

Process

Figure 3:
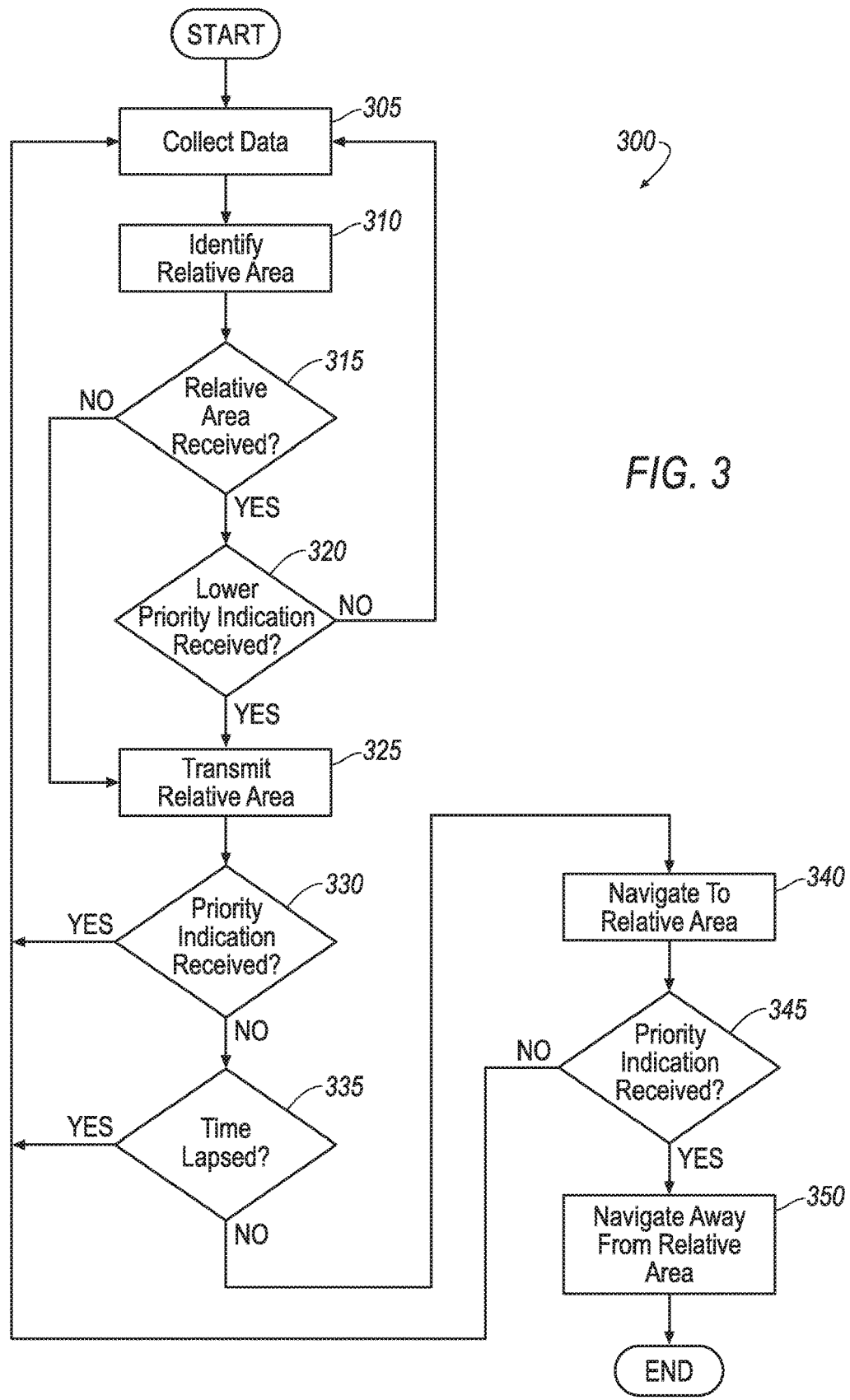
FIG. 3 is a flow chart of an example process of controlling the example system of FIG. 1.

FIG. 3 is a process flow diagram illustrating an exemplary process 300 for detecting future navigations of one more second vehicles 24 and for navigating a first vehicle 22 to change lanes. The process 300 may be executed according to instructions stored in and executable by the computer 26.

The process 300 begins in a block 305 in which the computer 26 receives data, e.g., in messages via the vehicle communications network, from the sensors 36, the navigation system 38, one or more second vehicles 24, etc., e.g., as described herein. The computer 26 may continue to receive data throughout the process 300. Throughout the process 300 in the present context means substantially continuously or at time intervals, e.g., every 100 milliseconds.

Next, at a block 310 the computer 26 identifies a relative area 28 within a threshold distance of the first vehicle 22, e.g., based on data received in the block 305 and as described herein.

Next, at a block 315 the computer 26 determines whether the relative area 28 has been received, e.g., from one or more second vehicles 24. Upon a determination that the relative area 28 has been received, the process 300 moves to a block 320. Upon a determination that the relative area 28 has not been received, the process 300 moves to a block 325.

At the block 320, the computer 26 determines whether a priority indication indicating a priority level lower than that of the first vehicle 22 was received along with the relative area 28. Upon a determination that such priority indication was received, the process 300 moves to the block 325. Upon a determination than no such priority indication was received, the process 300 moves to the block 305.

Next, at the block 325 the computer 26 transmits the relative area 28 to one or more second vehicles 24 within the threshold distance of the first vehicle 22. For example, the computer 26 may transmit the relative area 28 and an indication of the threshold distance, e.g., such that the second vehicles 24 can self-determine whether they were within the threshold distance of the transmitted relative area 28, e.g., by comparing the transmitted relative area 28 with a current location of the receiving second vehicle 24. The computer 26 may transmit a priority indication indicating a priority level of the first vehicle 22 along with the relative area 28.

Next, at a block 330 the computer 26 determines whether a priority indication has been received, e.g., from one or more second vehicles 24 having a higher priority level than the first vehicle 22, as described herein. Upon a determination that a priority indication has been received, the process 300 returns to the block 305. Upon a determination that a priority indication has not been received, the process 300 moves to a block 335.

At the block 335 the computer 26 determines whether a specified time has lapsed since transmitting the relative area 28, e.g., as described herein. Upon a determination that the specified time has lapsed, the process 300 returns to the block 305. Upon a determination that the specified time has not lapsed, the process 300 moves to a block 340.

At the block 340 the computer 26 controls the first vehicle 22 to execute a maneuver to occupy the relative area 28, e.g., by instructing the propulsion 30, the steering system 34, and/or the brake system 32 based on information from the sensors 36 and navigation system 38.

Next, at the block 345 the computer 26 determines whether a message including a priority indication and the relative area 28 has been received from a second vehicle 24 having a higher priority level than the first vehicle 22, e.g., indicating the second vehicle 24 plans to navigate to the relative area 28 now occupied by the first vehicle 22. Upon a determination that the priority indication has not been received, the process 300 returns to the block 305. Upon a determination that a priority indication has been received, the process moves to the block 350.

At the block 350 the computer 26 controls the first vehicle 22 to navigate away from the relative area 28, e.g., to change lanes, move to a side of the road, etc.

After the block 350 the process 300 may end. Alternately, the process 300 may return to the block 305.

Conclusion

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The article "a" modifying a noun should be understood as meaning one or more unless stated otherwise, or context requires otherwise. The phrase "based on" encompasses being partly or entirely based on.

What is claimed is:

1. A system, comprising a processor; and a non-transitory computer readable medium storing instructions executable by the processor to:
   identify, based on data from a sensor of a first vehicle, a relative area in a lane adjacent the first vehicle, the relative area having a length and being within a specified distance from the first vehicle and free of another vehicle;
   identify a second vehicle within a second specified distance of the relative area;
   transmit the relative area to the second vehicle; and
   navigate the first vehicle to the relative area in the adjacent lane and within a specified time.

2. The system of claim 1, wherein the instructions further include instructions to refrain from navigating the first vehicle to the relative area upon receiving a message from the second vehicle including the relative area and a priority indication before the specified time has lapsed and before navigating the first vehicle to the relative area.

3. The system of claim 2, wherein the priority indication specifies a vehicle maneuver.

4. The system of claim 2, wherein the priority indication specifies a vehicle class.

5. The system of claim 1, wherein the instructions further include instructions to transmit the specified time along with the relative area.

6. The system of claim 1, wherein the instructions further include instructions to transmit a release message after transmitting the relative area.

7. The system of claim 1, wherein the relative area includes a plurality of positions and a plurality of times, each position associated with a specific time.

8. The system of claim 1, wherein the instructions further include instructions to refrain from navigating the first vehicle to the relative area upon failing to navigate the first vehicle to the relative area within the specified time.

9. The system of claim 1, wherein the instructions further include instructions to navigate the first vehicle away from the relative area after navigating the first vehicle to the relative area and upon receiving a message from a third vehicle including the relative area and a priority indication.

10. A system comprising:
    a vehicle sensor;
    a propulsion system;
    a steering system; and
       a computer in communication with the vehicle sensor, the propulsion system, and the steering system, the computer including a processor and a memory, the memory storing instructions executable by the processor to:
       identify, based on information from the vehicle sensor, a relative area in a lane adjacent a first vehicle, the relative area having a length and being within a specified distance from the first vehicle and free of another vehicle;
       identify a second vehicle within a second specified distance of the relative area;
       transmit the relative area to the second vehicle; and
       actuate the propulsion system and the steering system to navigate the first vehicle to the relative area in the lane adjacent the first vehicle within a specified time.

11. The system of claim 10, wherein the vehicle sensor is one of a LIDAR, a sonar, and a camera.

12. The system of claim 10, wherein the memory further stores instruction executable by the processor to identify the second vehicle based on information from the vehicle sensor.

13. The system of claim 10, wherein the memory further stores instructions executable by the processor to transmit the specified time with the relative area.

14. The system of claim 10, wherein the memory further stores instructions executable by the processor to transmit a release message after transmitting the relative area.

15. The system of claim 10, wherein the relative area includes a plurality of positions and a plurality of times, each position associated with a specific time.

16. A method, comprising:
    identifying a relative area in a lane adjacent a first vehicle and within a specified distance from the first vehicle and free of another vehicle;
    identifying a second vehicle within a second specified distance of the relative area;
    transmitting the relative area to the second vehicle; and
    navigating the first vehicle to the relative area in the lane adjacent the first vehicle within a specified time.

17. The method of claim 16, further comprising transmitting the specified time with the relative area.

18. The method of claim 16, further comprising transmitting a release message after transmitting the relative area.

19. The method of claim 16, wherein the relative area includes a plurality of positions and a plurality of times, each position associated with a specific time.

20. The method of claim 16, further comprising navigating the first vehicle away from the relative area after navigating the first vehicle to the relative area and upon receiving a message from a third vehicle including the relative area and a priority indication.

* * * * *